US005745561A

United States Patent [19]
Baker et al.

[11] Patent Number: 5,745,561
[45] Date of Patent: Apr. 28, 1998

[54] MULTIPLE INDEPENDENT NAMED CALL-COVERAGE PATHS

[75] Inventors: Stephen A. Baker; Douglas J. Blondin, both of Thornton, Colo.

[73] Assignee: Lucent Technologies Inc., Murray Hill, N.J.

[21] Appl. No.: 656,133

[22] Filed: May 31, 1996

[51] Int. Cl.⁶ ............................................. H04M 3/54
[52] U.S. Cl. ................. 379/210; 379/211; 379/102.01
[58] Field of Search ................................. 379/210, 211, 379/212, 201, 214, 142, 102.01

[56] References Cited

U.S. PATENT DOCUMENTS

| | | | |
|---|---|---|---|
| 4,723,273 | 2/1988 | Diesel et al. | 379/211 |
| 4,747,127 | 5/1988 | Hansen et al. | 379/94 |
| 5,018,191 | 5/1991 | Catron et al. | 379/100 |
| 5,206,901 | 4/1993 | Harlow et al. | 379/211 |
| 5,222,125 | 6/1993 | Creswell et al. | 379/67 |
| 5,253,288 | 10/1993 | Frey et al. | 379/221 |
| 5,276,731 | 1/1994 | Arbel et al. | 379/211 |
| 5,329,578 | 7/1994 | Brennan et al. | 379/211 |
| 5,416,834 | 5/1995 | Bales et al. | 379/211 |

FOREIGN PATENT DOCUMENTS 2148952  6/1990  Japan ........................ H04M 3/42

OTHER PUBLICATIONS

Welcome to AT&T True Connections^SM (no date).
"G3V2 Feature Description", AT&T, Document No. 555-230-204, Call Coverage Issue 1, Jul. 1993, pp. 3-301-3-314.
The AT&T MultiMedia Communications eXchange, AT&T Publication No. GBCS-MCS-097P1, 1996.

Primary Examiner—Ahmad F. Matar
Attorney, Agent, or Firm—David Volejnicek

[57] ABSTRACT

An improved call-coverage arrangement (106) allows a principal (120) to program (administer) and name multiple independent call-coverage paths (211) for the principal's telephone number. Selection of an individual call-coverage path for an individual call to the principal's telephone number depends either on which one of the call-coverage path is active (221) or on which one of the call-coverage path's selection criteria (212) are matched by the parameters of the call. The selection criteria are likewise programmable by the principal. The principal remembers and accesses (for administration) individual call-coverage paths by name (220).

14 Claims, 4 Drawing Sheets

MULTIPLE INDEPENDENT NAMED CALL-COVERAGE PATHS

TECHNICAL FIELD

This invention relates to telecommunications user features.

BACKGROUND OF THE INVENTION

Call coverage is a call-redirection feature that provides for a plurality of alternative-destination telephone numbers (or other addresses) to which the telecommunications system can sequentially try to deliver a call (or other communication) intended for a principal telephone number when the call cannot be delivered to the principal telephone number or when the principal elects to not receive the call at the principal telephone number.

Unlike call forwarding, which is a call-redirection feature that provides a single alternative-destination telephone number for calls to the principal, call coverage has not been user-programmable. That is, the principal could not program his or her own call-coverage path, but had to rely on an administrator of the telecommunications system to do so. This has changed with the introduction of the AT&T True Connections® service. The call sequencing feature of this service allows a principal to program his or her own call-coverage path (called a reach list).

Conventional telecommunications systems allow for one call-coverage path for each telephone number served by the system (i.e., for each extension number). A principal may have a plurality of extension numbers, and to that extent may have a plurality of call-coverage paths. The AT&T Definity® G3V2 private branch exchange (PBX) provides a capability of linking these separate call-coverage paths into a single long call-coverage path that is common to the plurality of the principal's extension numbers.

SUMMARY OF THE INVENTION

In accordance with the principles of this invention, an advance is made over the prior art by providing for multiple independent, preferably user-programmable, coverage paths at least one of which may be active at any one time, and further by providing for user naming of the coverage paths to facilitate the user's recognition of, and differentiation between, the multiple paths.

According to one aspect of the invention, a telecommunications system includes a memory, associated with a principal address (e.g., a principal telephone number) for receiving communications (e.g., calls), that stores information defining a plurality of independent coverage paths for the principal address, wherein each coverage path comprises a plurality of alternative addresses for receiving a communication directed to the principal address. In response to receipt of a communication directed to the principal address, the system selects one of the plurality of coverage paths, and redirects the communication to an alternative address included in the selected coverage path. Illustratively, the stored call coverage information either indicates which of the coverage paths is active or includes criteria for selecting each coverage path, and the system selects either the one of the plurality of coverage paths that is active, or the one of the plurality of coverage paths whose criteria are satisfied by the call. The principal address is assigned to a principal as the address of communications intended for the principal, and the information defining the plurality of independent coverage paths is preferably programmable by the principal. The information defining the plurality of independent coverage paths preferably includes, for each coverage path, a different name given to the coverage path by the principal. The name is likewise programmable by the principal. In response to receipt from the principal of one of the names, the system gives the principal access to the stored information defining the coverage path having that name.

According to another aspect of the invention, a method of providing coverage for a communication directed to a principal address comprises the following steps. In response to receipt of the communication directed to the principal address, a coverage path for the communication is selected from a plurality of independent coverage paths that are defined for the principal address. Each defined coverage path comprises a plurality of alternative addresses for receiving the communication directed to the principal address. In response to the selection, the communication is redirected to an alternative address included in the selected coverage path. Preferably, the principal names the coverage paths, and programs their definitions including their names. The principal then accesses the definitions of individual paths by the path names.

We have recognized that a user's call-coverage needs may change over time due to various conditions. User programmability of coverage paths gives direct control to the user to change their coverage paths as their need changes, rather than having to go through a central administrator who may not be able to meet the user's changing needs in a timely manner.

We have also recognized that a user may need different call-coverage paths for different situations. For example, a user may wish to implement time-of-day dependency into his or her call-redirection, wherein one call-coverage path is active during working hours, but another call-coverage path is active during the evening and night and on weekends. Multiple call-coverage paths provide the user with the ability to set up different call-coverage paths for the different situations. The user then simply activates the coverage path that is appropriate for the present situation, without having to reprogram each coverage path each time that it is needed. Alternatively, the user may have a plurality of paths active, and simply specify to the system the selection criteria for selecting one or another of the paths. For example, the user may specify that one call-coverage path be used for inside calls (ones originating from other extension numbers of the system) and that another call-coverage path be used for outside calls.

Finally, we have recognized that, in a multiple call-coverage path environment, a user needs an easy way to identify individual paths and to differentiate between them. User naming of coverage paths allows the user to associate a different meaningful and easily-recognizable tag—a name—with each path. This provides the user with an easy way to denote, describe, renumber, and recognize each path. For example, meaningful tags for the call paths of time-of-day scenario presented above may be "9-to-5" and "off-hours", and for the inside/outside call-origination scenario may be "internal calls" and "external calls".

These and other advantages and features of the present invention will become more apparent from the following description of an illustrative embodiment of the invention taken together with the drawing.

DETAILED DESCRIPTION

Figure 1:
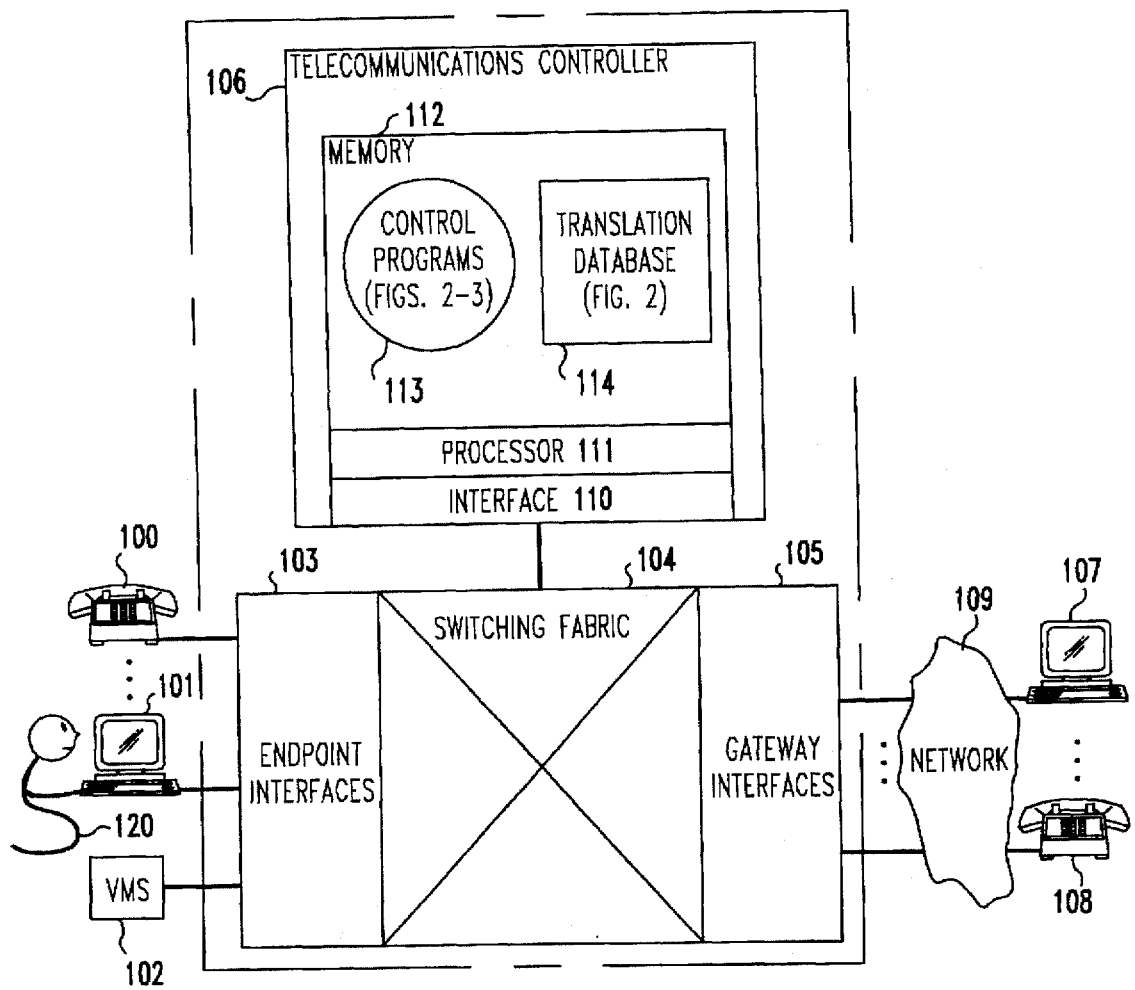
FIG. 1 is a block diagram of a telecommunications system that includes an illustrative embodiment of the invention.

FIG. 1 shows an illustrative telecommunications system. It includes a plurality of telecommunications endpoints 100–102 coupled by endpoint interfaces 103 to a switching fabric 104 which selectively interconnects endpoints 100–102 with each other under control of a telecommunications controller 106. Switching fabric 104 also selectively connects endpoints 100–102 via gateway interfaces 105 to an external telecommunications network 109 and therethrough to endpoints 107–108 served by network 109. Telecommunications controller 106 is a stored-program-controlled machine that includes a memory 112 for storing control programs 113 and control data including a translations database 114, a processor 111 that executes control programs 113 and uses control data including translations database 114 to control switching fabric 104, and an interface 110 to switching fabric 104 through which processor 111 communicates with switching fabric 104 and other entities of the system of FIG. 1.

As described so far, the telecommunications system of FIG. 1 is conventional. In one embodiment, elements 103–106 comprise a telephony switching system such as the AT&T Definity® PBX, endpoints 100–101 and 107–108 comprise telephones, fax machines, data terminals, etc., VMS 102 comprises the AT&T Intuity® multimedia messaging system, and network 109 comprises the public or a private telecommunications network. In another embodiment, telecommunications controller 106 comprises the AT&T MMCX multimedia communications exchange, switching fabric 104 comprises a local area network (LAN), interfaces 103 and 105 comprise LAN interfaces, endpoints 100–101 and 107–108 comprise multimedia workstations, VMS 102 comprises the AT&T Intuity® multimedia messaging system, and network 109 comprises a wide area network (WAN) or the public telecommunications network.

Figure 2:
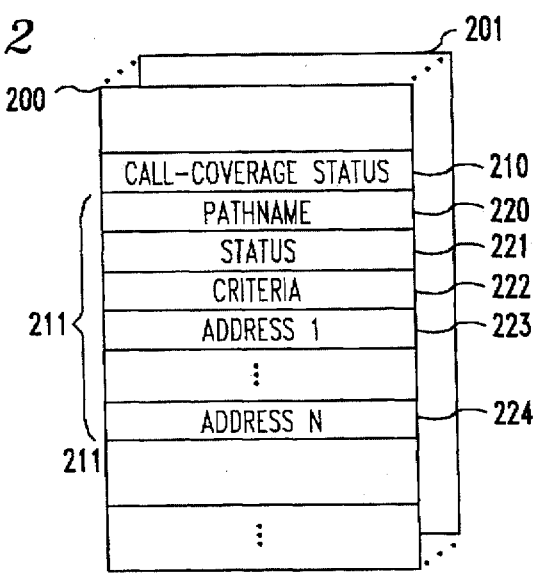
FIG. 2 is a block diagram of call-coverage path translations of the system of FIG. 1.

According to an illustrative embodiment of the invention and as shown in FIG. 2, translations database 114 includes sets of translations 200–201, one for each principal address (e.g., extension number) served by communications controller 106, each of which provides for definitions of a plurality of call-coverage paths 211. Each definition of a call-coverage path 211 includes a path name 220, a status (active or inactive) indicator 221, a criteria list 222 that specifies the criteria for determining when to use this call-coverage path, and a sequence of addresses (e.g., telephone numbers) 223–224 that make up this call-coverage path. The call-coverage data of each set of translations 200–201 further include a call-coverage status 210 that indicates whether the call-coverage feature is or is not activated for the corresponding principal address. Further according to the illustrative embodiment of the invention, control programs 113 of telecommunications controller 106 include a call-coverage-path administration program and a call-coverage call-processing program, whose functionalities are respectively shown in FIGS. 3 and 4.

Figure 3:
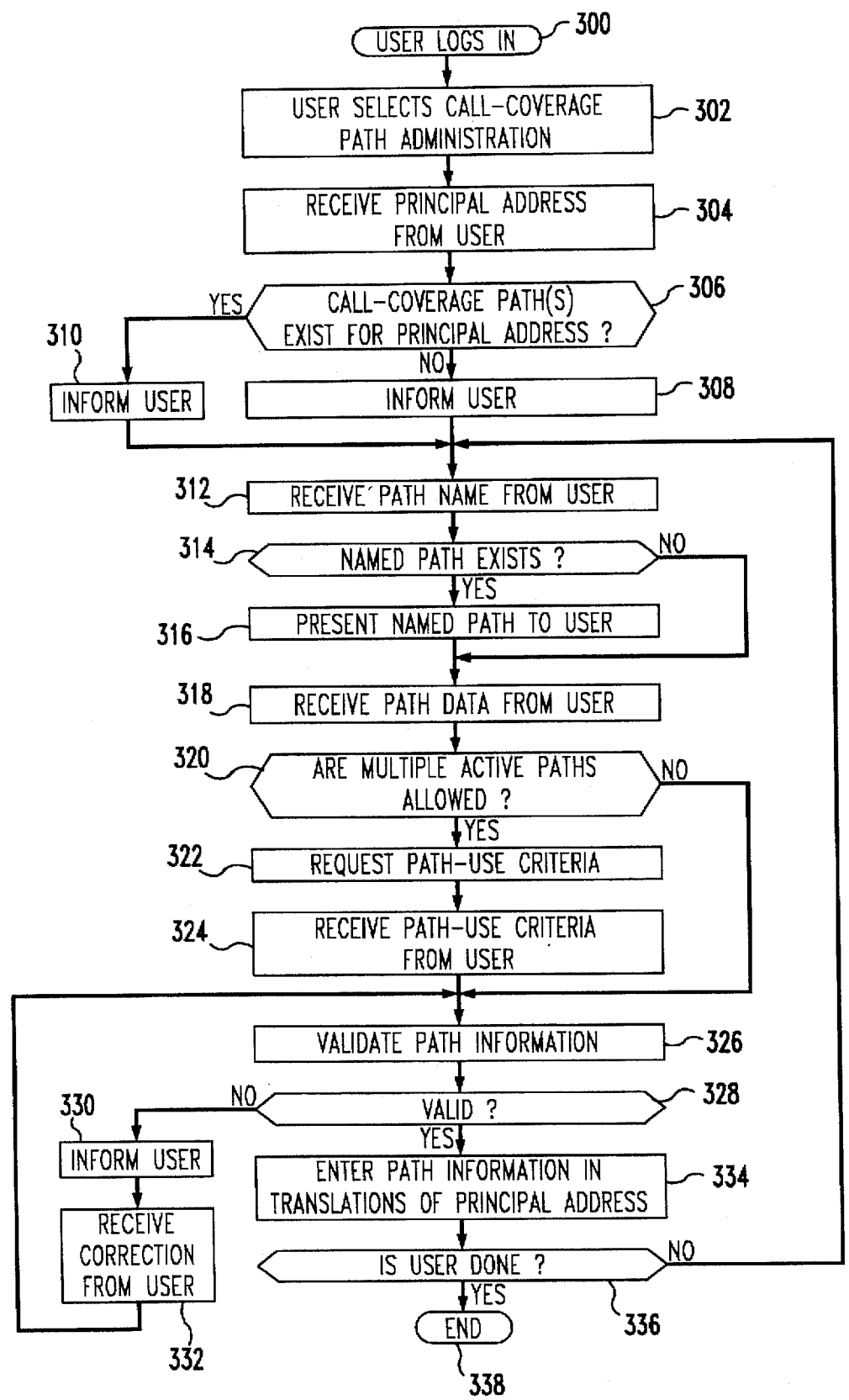
FIG. 3 is a functional flow diagram of call-coverage path administration activities of the system of FIG. 1.
Figure 5:
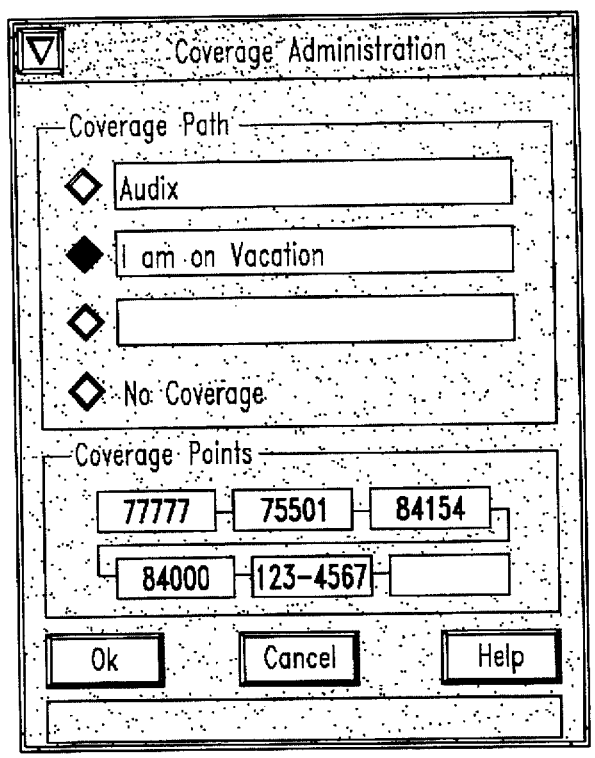
FIG. 5 is a view of a call-coverage path administration window displayed as a part of the administration activities of FIG. 3.
Figure 6:
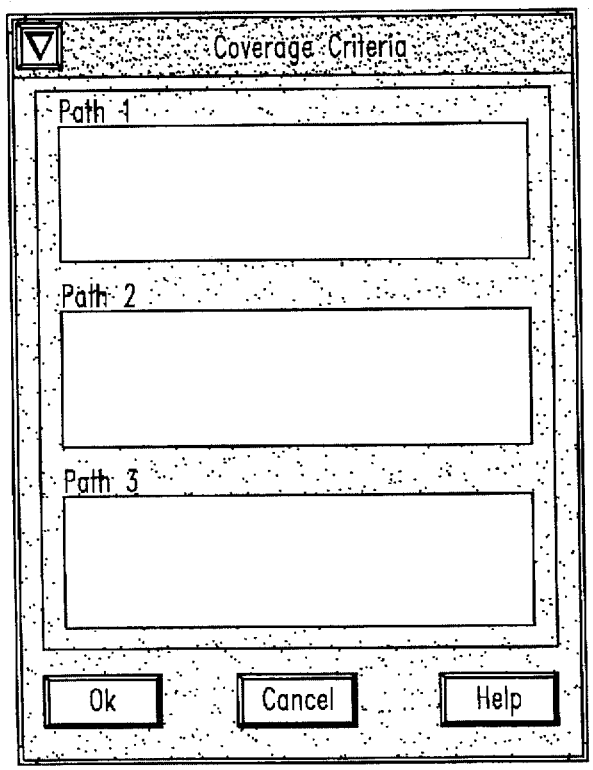
FIG. 6 is a call-coverage path-selection criteria administration window displayed as a part of the administration activities of FIG. 3.

As shown in FIG. 3, a principal or another user 120 who wishes to administer a call-coverage path logs into telecommunications controller 106 through one of the endpoints 100–101 or 107–108, at step 300, selects call-coverage path administration from an activities menu, at step 302, and provides the principal address (extension number) whose call-coverage he or she wishes to administer, at step 304. In the case of telecommunications controller 106 being the AT&T Definity PBX, the user is presented with a Touch-Tone signaling interface for administering the call-coverage feature. In the case of telecommunications controller 106 being the AT&T MMCX exchange, the user is presented with a graphical-user interface (GUI), such as the one shown in FIG. 5, for administering the call-coverage feature. In response, controller 106 checks translations 200 of the principal address to determine whether it has one or more call-coverage paths 211 specified, at step 306, and informs the user accordingly, at step 308 or 310. In the case of the Touch-Tone signaling interface, the user is informed via played-back announcements. In the case of the GUI interface, the user is presented either with a blank window of FIG. 5, at step 308, or with the window of FIG. 5 populated with the existing call-coverage data, at step 310. The user then provides a call-coverage path name by which he or she refers to, and remembers, a particular call-coverage path, at step 312. In response, controller 106 checks whether a call-coverage path 211 of that pathname 220 already exists in the address' translations 200, at step 314, and if so, presents that path 211 to the user, at step 316. In the case of the Touch-Tone interface, the addresses that make up the coverage path are announced to the user; in the case of the GUI interface, they are displayed in the "Coverage Points" area of the window of FIG. 5. Following step 316, or if a path of that name is not found to exist at step 314, the user provides data to program or reprogram entries 221 and 223–224 of the path 211, at step 318. If the system allows for multiple active paths, as indicated at step 320, the user is also asked to provide criteria 222 defining when this path is to be used, at step 322. In the case of the Touch-Tone interface, this is done via a played-back announcement; in the case of the GUI interface, the user is presented with a window such as the one shown in FIG. 6. If multiple active paths are not allowed, or after the user provides the path-use criteria at step 324, controller 106 validates all of the information that was entered by the user, at step 326. For example, controller 106 checks that all path names for this principal address are unique, that all addresses of coverage points are valid, and that path-use criteria of multiple call-coverage paths for this principal address do not conflict with each other. If any of the call-coverage information for this principal address is invalid, as determined at step 328, controller 106 informs the user, at step 330. Upon receiving a correction from the user, at step 332, controller 106 repeats the validation, at step 326. When the call-coverage information for this principal address is determined to be valid at step 328, controller 106 enters the information provided by the user at steps 304, 312, 318, and 324 in fields 220–224 of the subject path 211, at step 334. If the user is not done administering call paths, as determined at step 336, the system returns to step 312 to administer another call path 211; if the user is done, call-path administration ends, at step 338.

Figure 4:
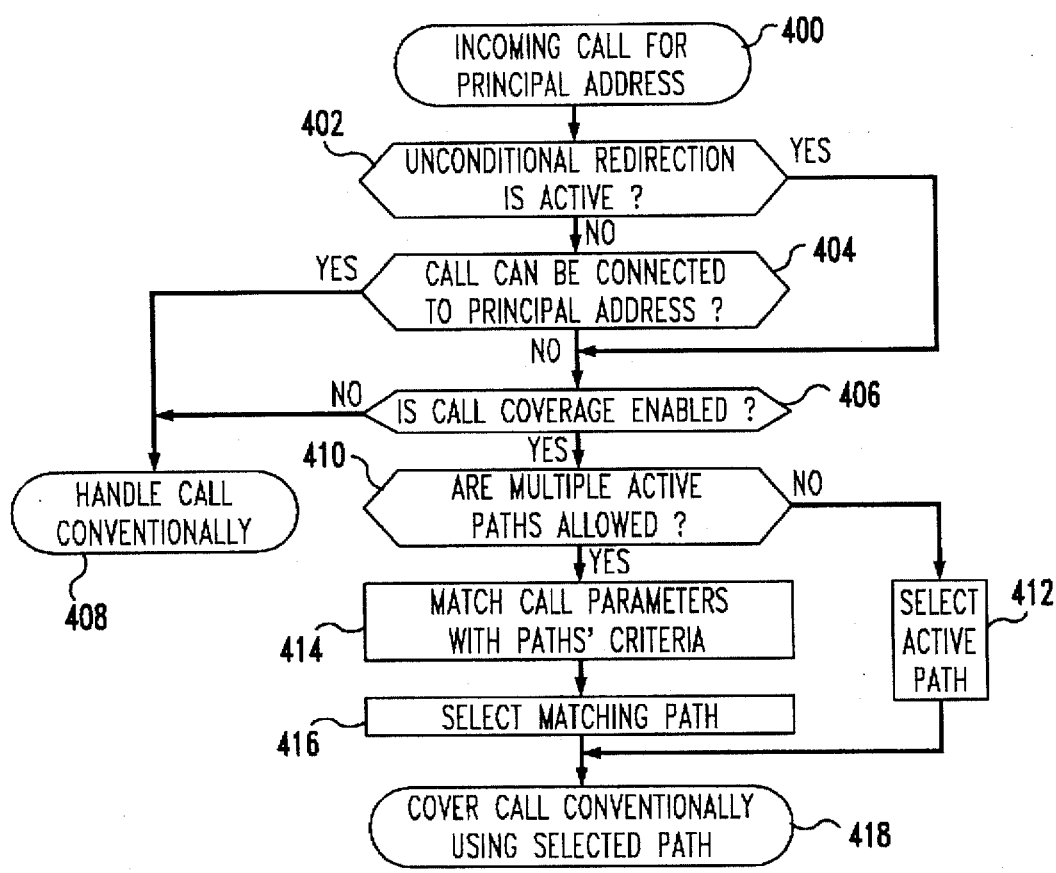
FIG. 4 is a functional flow diagram of call-coverage path call-processing activities of the system of FIG. 1.

As shown in FIG. 4, when a call comes in for a principal address, at step 400, a call-processing function of controller 106 determines in a conventional manner if unconditional call redirection is active for this address (e.g., the user of the endpoint that corresponds to the address has pushed a "send-all-calls" button), at step 402. If unconditional call redirection is not active, controller 106 conventionally attempts to connect the call to the principal address, and if the attempt succeeds, as determined at step 404, the call is handled conventionally, at step 408. However, if the attempt fails (for example, because the endpoint of the principal address is busy or does not answer), of if it has been determined at step 402 that unconditional redirection is active, controller 106 checks call-coverage status 220 of the principal address' translations 200, at step 406. If call coverage is not enabled, controller 106 handles the call conventionally, at step 408. If call coverage is enabled, further call-coverage processing depends on whether multiple active call-coverage paths are allowed, as indicated at step 410. If multiple active paths are not allowed, the call-processing function of controller 106 examines status indicators 221 of all paths 211 of the principal number and selects the active path 211, at step 412. If multiple active paths are allowed, the call-processing function of controller 106 attempts to match parameters of the incoming call against criteria 222 of all paths 211 of the principal number whose status indicators 221 indicate that they are active, at step 414, and selects the matching path, at step 416. One of the paths 211 may have criteria 222 of "default", which result in the selection of this path 211 when the criteria 222 of no other paths 211 match the call parameters. Following step 412 or 416, the call-processing function of controller 106 uses the selected one path 211 in a conventional manner to provide call-coverage to the incoming call, at step 418.

Of course, various changes and modifications to the illustrative embodiment described above will be apparent to those skilled in the art. These changes and modifications can be made without departing from the spirit and the scope of the invention and without diminishing its attendant advantages. It is therefore intended that such changes and modifications be covered by the following claims.

The invention claimed is:

1. A communications system comprising:

a memory, associated with a principal address for receiving communications, for storing information defining a plurality of independent coverage paths for the principal address, each coverage path comprising a plurality of alternative addresses for receiving a communication directed to the principal address, an indication of whether the coverage path has been made active by the principal, and a name of the cover path given to the coverage path by the principal, the name being independent of criteria for using the coverage path and different from names of all others of the plurality of independent coverage paths for the principal address; and means selectively responsive to receipt of a communication directed to the principal address, for selecting an active one of the plurality of coverage paths to an exclusion of all others of the plurality of coverage paths and redirecting the communication to an alternative address included in the selected coverage path.

2. The system of claim 1 wherein:

the principal address is assigned to a principal for use as an address of communications intended for the principal; and the information defining the plurality of independent coverage paths is programmable by the principal.

3. The system of claim 2 further comprising:

means responsive to receipt from the principal of one of the names, for giving the principal access to the stored information defining the corresponding coverage path.

4. A call-processing system comprising:

a memory for storing call-coverage information for a telephone number, said information defining a plurality of independent call-coverage paths for the telephone number, each call-coverage path having an indication of whether the call-coverage path has been made active by the principal, and further having a name given to the call-coverage path by the principal, the name being independent of criteria for using the call-coverage path and different from names of all others of the plurality of independent call-coverage paths for the telephone number; and means selectively responsive to receipt of a call directed to the telephone number, for selecting an active one of the plurality of call-coverage paths to an exclusion of all others of the plurality of call-coverage paths and redirecting the call as specified by the selected call-coverage path.

5. The system of claim 4 wherein:

the telephone number is assigned to the principal as the principal's telephone number; and the information defining the plurality of independent call-coverage paths for the telephone number, including the names, is programmable by the principal.

6. The system of claim 4 wherein:

the telephone number is assigned to a principal for use as an address of calls that are intended for the principal; and the system further comprises means for interacting with the principal to enable the principal to program the call-coverage paths.

7. The system of claim 4 wherein:

the telephone number is assigned to a principal for use as an address of calls that are intended for the principal; and the system further comprises means responsive to receipt from the principal of the information defining the plurality of independent call-coverage paths for the telephone number, for storing the received information in the memory as the call-coverage information.

8. The system of claim 4 wherein:

the telephone number is assigned to the principal as the principal's telephone number;

the name of each call-coverage path comprises a mnemonic tag that is different for each of the plurality of independent call-coverage paths; and the system further includes means responsive to receipt from the principal of one of the mnemonic tags, for giving to the principal access to the stored information defining the corresponding call-coverage path.

9. The system of claim 8 wherein: the mnemonic tags are programmable by the principal.

10. The system of claim 4 wherein:

the stored call-coverage information includes criteria for selecting each call-coverage path; and the selecting means include means for determining which call-coverage path's criteria have been satisfied by the call and selecting the call-coverage path whose criteria have been satisfied.

11. The system of claim 4 further comprising means responsive to receipt from the principal of the information defining one of the call-coverage paths, including the name, for storing the received information in the memory as a part of the information defining the plurality of call-coverage paths, and means responsive to receipt from the principal of the name, for giving to the principal access to the stored information defining the corresponding one of the call-coverage paths.

12. A method of providing coverage for a communication directed to a principal address, comprising the steps of:

selectively in response to receipt of the communication directed to the principal address, selecting an active coverage path for the communication to an exclusion of all others of a plurality of independent coverage paths defined for the principal address, wherein each coverage path comprises a plurality of alternative addresses for receiving the communication directed to the principal address, an indication of whether the coverage path has been made active by the principal, and a name of the coverage path given to the coverage path by the principal, the name being independent of criteria for using the coverage path and different from names of all others of the plurality of independent coverage paths for the principal address; and in response to the selection, redirecting the communication to an alternative address included in the selected coverage path.

13. The method of claim 12 wherein:

the principal address is assigned to the principal for use as an address of communications intended for the principal, and the method further comprises the step of the principal programming the information that defines the plurality of independent coverage paths, including the names.

14. The method of claim 13 further comprising the step of:

in response to receiving one of the names from the principal, giving the principal access to the information that defines the coverage path having that name.

* * * * *